United States Patent

Tilgner et al.

[11] Patent Number: 4,691,422
[45] Date of Patent: Sep. 8, 1987

[54] METHOD AND APPARATUS FOR MAKING BALL AND SOCKET JOINTS INCORPORATING A SLIP LINER

[75] Inventors: Leopold Tilgner, Püttlingen; Jurgen Scholer, Losheim-Wahlen; Sieghart Sautter, Saarlous; Jürgen Vogel, Künzelsau, all of Fed. Rep. of Germany

[73] Assignee: SKF Gleitlager GmbH, Schweinfurt, Fed. Rep. of Germany

[21] Appl. No.: 884,083

[22] Filed: Jul. 10, 1986

[30] Foreign Application Priority Data

Jul. 11, 1985 [DE] Fed. Rep. of Germany ....... 3524761

[51] Int. Cl.⁴ .................. B21D 53/10; B23P 19/00
[52] U.S. Cl. .................. 29/149.5 B; 29/149.5 C; 29/149.5 NM; 29/434; 29/527.1; 29/700; 29/DIG. 29; 264/242; 264/269; 403/122
[58] Field of Search .......... 29/149.5 B, 149.5 C, 29/149.5 NM, 434, 527.1, 700, DIG. 29; 264/269, 242, 267; 403/122

[56] References Cited

U.S. PATENT DOCUMENTS

| | | | |
|---|---|---|---|
| 3,094,376 | 6/1963 | Thomas | 264/242 X |
| 3,179,477 | 4/1965 | Carter | 29/149.5 B X |
| 3,218,383 | 11/1965 | White | 29/149.5 B |
| 3,221,391 | 12/1965 | Heim | 29/149.5 B |
| 3,941,495 | 3/1976 | Duncan | 264/242 |
| 4,290,181 | 9/1981 | Jackson | 264/242 |
| 4,571,811 | 2/1986 | Pruvost | 29/149.5 B |

Primary Examiner—Howard N. Goldberg
Assistant Examiner—Ronald S. Wallace
Attorney, Agent, or Firm—Eugene E. Renz, Jr.

[57] ABSTRACT

A method for making ball and socket joints with a slip liner of a friction reducing material consisting of the steps of inserting and centering a ring tool in the bore of the outer ring, filling the space between the outer ring and the ring tool with a friction reducing material; separating the ends of the outer ring and simultaneously breaking the slip liner at a predetermined point, removing the ring tool, and inserting the inner ring of the ball and socket joint.

4 Claims, 4 Drawing Figures

METHOD AND APPARATUS FOR MAKING BALL AND SOCKET JOINTS INCORPORATING A SLIP LINER

FIELD OF THE INVENTION

The present invention relates to method and apparatus for making ball and socket joints with a slip liner of a friction reducing material such as plastic, which is cast or injected into the bore of the outer ring and to a ball and socket joint made thereby.

BACKGROUND OF THE INVENTION

Ball and socket joints of this general type are previously known from West German Registered Design No. 1,815,640. In accordance with this prior known design, the slip liner is injected into the space between the inner and outer rings and then a filler piece is pressed into the slot having a predetermined thickness calculated to produce a predetermined desired radial gap in the bearing. This design presents the disadvantage that it comprises a multiplicity of parts which must be secured by employing specific measures. Furthermore, in the assembly procedure, it is necessary to deform the bore of the outer ring into an oval shape in order to accommodate the filler piece which is pressed in place and this procedure usually results in sacrificing accurate inner ring guidance.

With the foregoing in mind, it is an object of the present invention to provide a method and apparatus for making ball and socket joints of the type generally described which comprises comparatively few parts and which can be produced easily and economically and wherein the bearing play can be adjusted without deforming the outer ring. To this end and in accordance with the method of the present invention, a ring tool is inserted and centered in the bore of the outer ring and thereafter the space between the outer ring and the ring tool is filled by casting or injection with a friction reducing substance, usually a form of plastic. After the plastic sets, the ends of the outer ring are separated which breaks the slip liner at a predetermined break point. The ring tool is then removed and the inner ring of the ball and socket joint is inserted in the bore.

In accordance with another feature of the present invention, annular recesses are formed in the slip liner during the casting or molding or injection process which minimize edge stresses and the danger of fracture are essentially eliminated.

Further, in accordance with the method of the present invention, the amount of play between the inner and outer rings can be selectively controlled by use of an appropriately sized ring tool and preferably an appropriately large ring tool during the injection or casting of the slip liner in the bore of the outer ring.

In accordance with still another feature of the present invention, the apparatus for carrying out the casting process is provided with a blade-like section extending almost over the entire width of the outer ring adjacent the separating line. The separating section projects beyond the lateral surface of the ring tool by a distance corresponding to the thickness of the slip liner. Preferably, the ring tool is made up of a central section and two outer sections attached to the end surfaces wherein the outer diameter of the outer section is larger than the central section and preferably smaller than the inner diameter of the outer ring bore. By this configuration, the slip liner is formed with its ring-shaped free space in the outer region on the side facing the inner ring.

BRIEF DESCRIPTION OF THE DRAWINGS

These and other objects of the present invention and the various features and details of the operation and construction thereof are hereinafter more fully set forth with reference to the accompanying drawings, wherein.

DETAILED DESCRIPTION OF THE PREFERRED EMBODIMENTS

Figure 1:
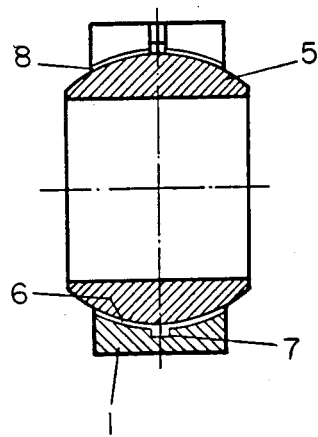
FIG. 1 is a side elevational view of a ball and socket joint in accordance with the present invention with sections cut away to show the internal construction more clearly.
Figure 2:
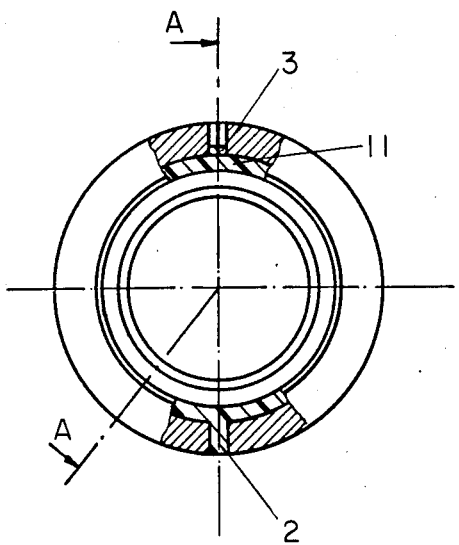
FIG. 2 is a sectional view taken along lines A—A of FIG. 1.

Referring now to the drawings and particularly to FIGS. 1 and 2 thereof, there is illustrated a ball and socket joint made in accordance with the present invention comprising broadly spaced inner and outer rings 5 and 1, respectively. The outer ring 1 is split at a point about its circumference and has a plurality of circumferentially spaced radial openings or holes 2. One of these radial openings or holes 3 is arranged in such a way that its center lies on a transversely extending separating line 4. A circumferential groove 7 is provided in the spherical bore 6 of the outer ring 1 communicating with the radial holes 2, 3. By this arrangement, a slip liner 8 of plastic material disposed between the inner and outer rings is rigidly connected to the outer ring. Slip liner 8 is preferably made of a high-performance thermoplastic material with high heat resistance such as polyphenylene sulfide, polyether sulfone, polyether ether ketone, polyamide-imide, or polyether imide and a suitable filler. Suitable fillers include graphite, carbon fibers, glass fibers, Teflon ®, molybdenum disulfide, silicone oil, mineral oils, etc. Furthermore, it is advantageous in accordance with the present invention to temper the parts to increase the wear properties due to the fact that the material structure has greater crystallinity.

Figure 3:
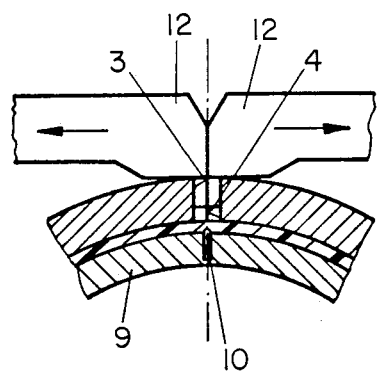
FIG. 3 is a fragmentary, sectional view showing apparatus for making ball and socket joint in accordance with the present invention.

Consider now the steps for making a lined ball and socket joint in accordance with the present invention. Before injection or casting slip liner 8 in the outer ring, a ring tool 9 is inserted in the bore 6. The diameter of the ball is smaller than the diameter of the bore 6 by an amount corresponding to the thickness T of the slip liner and the required bearing play. Outer ring 1 is then inserted together with ring tool 9 into an injection mold (not shown) and the space between the outer ring and the ring tool is filled with a self-lubricating plastic. The plastic penetrates the radial bores 2 in the outer ring and creates a positive interlock between slip liner 8 and outer ring 1. Note that ring tool 9 has an axially oriented blade section 10 adjacent separating line 4 which engages slip liner 8 and provides it with an appropriately configured predetermined break point 11. Accordingly, after the injection or casting step, the ends of the outer ring 1 are pulled apart in the direction of the arrows by means of a two-part separating tool 12 illustrated schematically in FIG. 3 and the slip liner 8 is separated at the break point. The ring tool 9 is then removed and thereafter the inner ring of the ball and socket joint is inserted. Following this, assembly tool 12 is removed. Since the slip layer or liner 8 is split at a break point, the otherwise unavoidable shrinkage of the plastic away from the spherical bore 6 in the outer ring is prevented.

Figure 4:
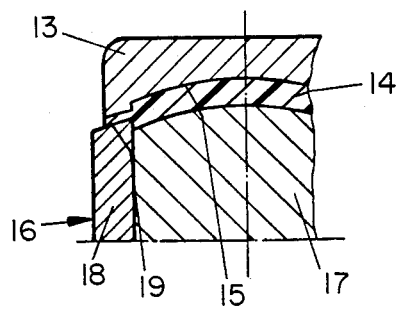
FIG. 4 is an enlarged fragmentary, sectional view of a modified form of apparatus for making a ball and socket joint in accordance with the present invention.

There is illustrated in FIG. 4 apparatus and method for filling the outer ring 13 of a ball and socket joint by casting. In this instance, slip liner 14 is disposed in an annular ring-shaped recess 15 in the outer ring 13. Ring tool 16 for this configuration consists of a central section 17 and two side parts 18 mounted at opposite axial ends. Note that side parts 18 have a maximum outer diameter which is larger than the diameter of the central section 17 so that in the area of the end surfaces, slip liner 14 is provided with ring-shaped free spaces 19 between slip liner 14 and inner ring 5 of the ball and socket joint. The free spaces essentially eliminate the danger of breakage during operation as a result of edge stress loading.

SUMMARY OF THE PRESENT INVENTION

In a ball and socket joint with a slip liner 8 of a friction reducing material such as plastic cast or injected in the bore 6 of the outer ring 1, the outer ring 1 and the slip liner 8 are provided with a break line 4 at a certain point.

So that the bearing play can be adjusted during the production of the ball and socket joint without deforming the outer ring 1, first a ring tool 9 is inserted into the bore 6 of the outer ring 1 and centered; then the space between the outer ring 1 and the ring tool 9 is injected or cast with friction reducing material; and finally the ends of the outer ring 1 are pulled apart and the slip liner 8 is split in the area of a predetermined break point 11. The ring tool 9 is removed, and the inner ring 5 of the ball and socket joint is inserted.

What is claimed is:

1. A method for making ball and socket joints with a slip liner of a friction reducing material consisting of the steps of:
   inserting and centering a ring tool in the bore of the outer ring, filling the space between the outer ring and the ring tool with a friction reducing material;
   separating the ends of the outer ring and simultaneously breaking the slip liner at a predetermined point, removing the ring tool, and inserting the inner ring of the ball and socket joint.

2. A method for making a ball and socket joint as claimed in claim 1 wherein ring-shaped free spaces are molded into the slip liner during the casting or injection process.

3. An apparatus for making ball and socket joints comprising inner and outer rings and a liner between the rings, the apparatus comprising a ring tool wherein the diameter of the ball is larger than that of the inner ring by an amount equal to the play in the bearing:
   said ring tool being provided in the area of the separating line with a blade-like section extending over nearly the entire width of the outer ring, this section projecting beyond the lateral surface of the ring tool by an amount equal to the thickness of the slipliner.

4. An apparatus for making ball and socket joints comprising inner and outer rings and a liner between the rings, the apparatus comprising a ring tool wherein the diameter of the ball is larger than that of the inner ring by an amount equal to the play in the bearing:
   said ring tool consisting of a central section and two outer sections attached to the end surfaces, the outer diameter of the outer sections being greater than that of the central section but preferably smaller than the inner diameter of the outer ring bore.

* * * * *